United States Patent [19]

Sankovich

[11] 3,951,272
[45] Apr. 20, 1976

[54] ARTICLE TRANSFER APPARATUS

[75] Inventor: Stanley Sankovich, Toledo, Ohio

[73] Assignee: Champion Spark Plug Company, Toledo, Ohio

[22] Filed: July 12, 1974

[21] Appl. No.: 487,919

[52] U.S. Cl. .............................. 214/1 BC; 198/210
[51] Int. Cl.² .......................................... B25J 15/02
[58] Field of Search ............ 214/1 BC, 1 B; 198/210

[56] References Cited
UNITED STATES PATENTS

| | | | |
|---|---|---|---|
| 2,253,283 | 8/1941 | Minaker | 214/1 BC |
| 2,811,267 | 10/1957 | Bock | 214/1 BC X |

Primary Examiner—Robert J. Spar
Assistant Examiner—Ross Weaver
Attorney, Agent, or Firm—Allen Owen

[57] ABSTRACT

An article transferring device for exchanging workpieces between first and second paths is disclosed. The device utilizes vertical reciprocal movement and 180° rotational movement to operate apparatus which grips workpieces traveling in the first path, raises them, transfers them to a position above the second path, lowers them into the second path and releases them. Cams responsive to vertical movement are provided for changing the spacing of each pair of workpiece grippers from a first spacing at the first path to a second spacing at the second path.

4 Claims, 10 Drawing Figures

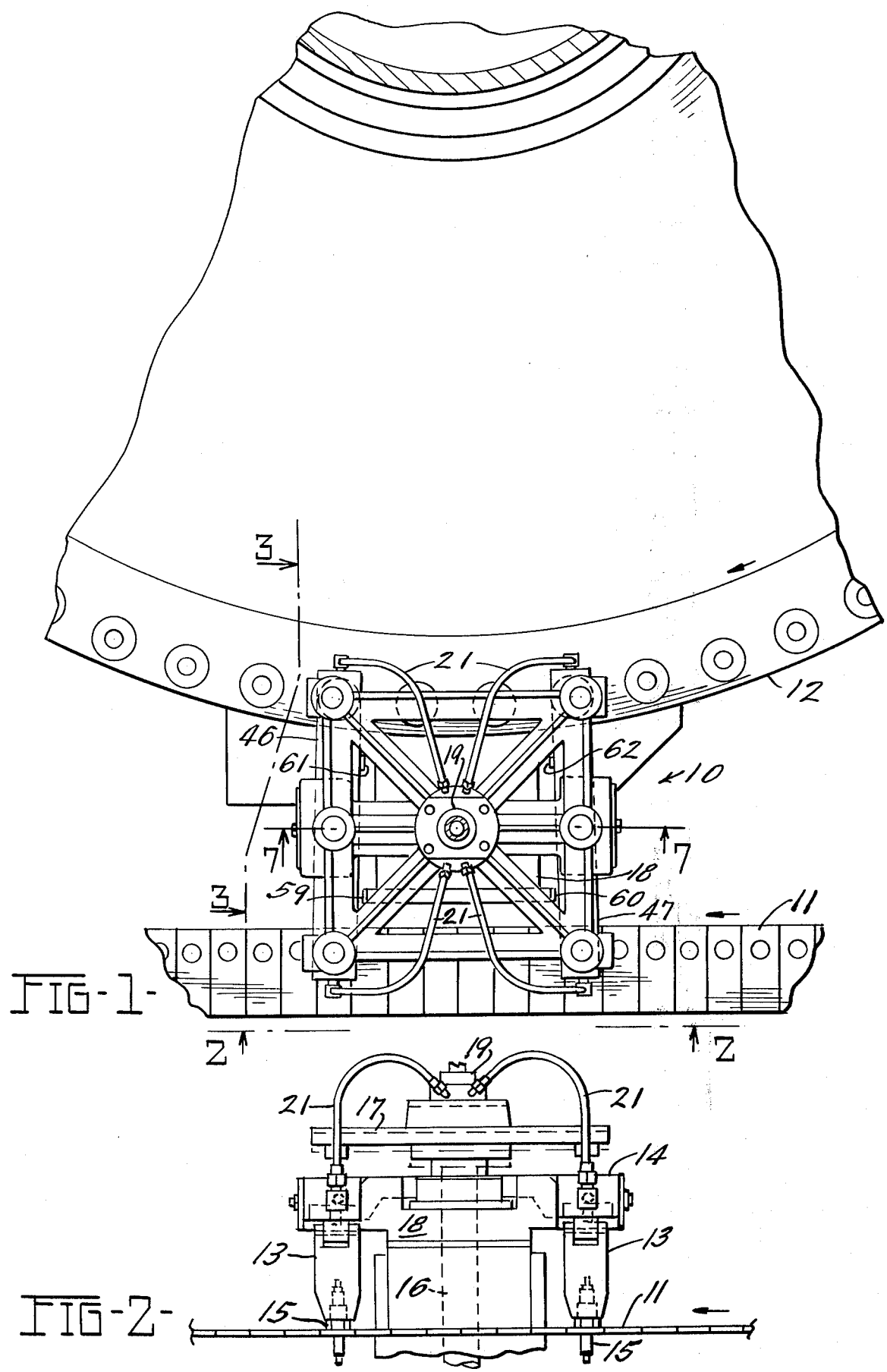

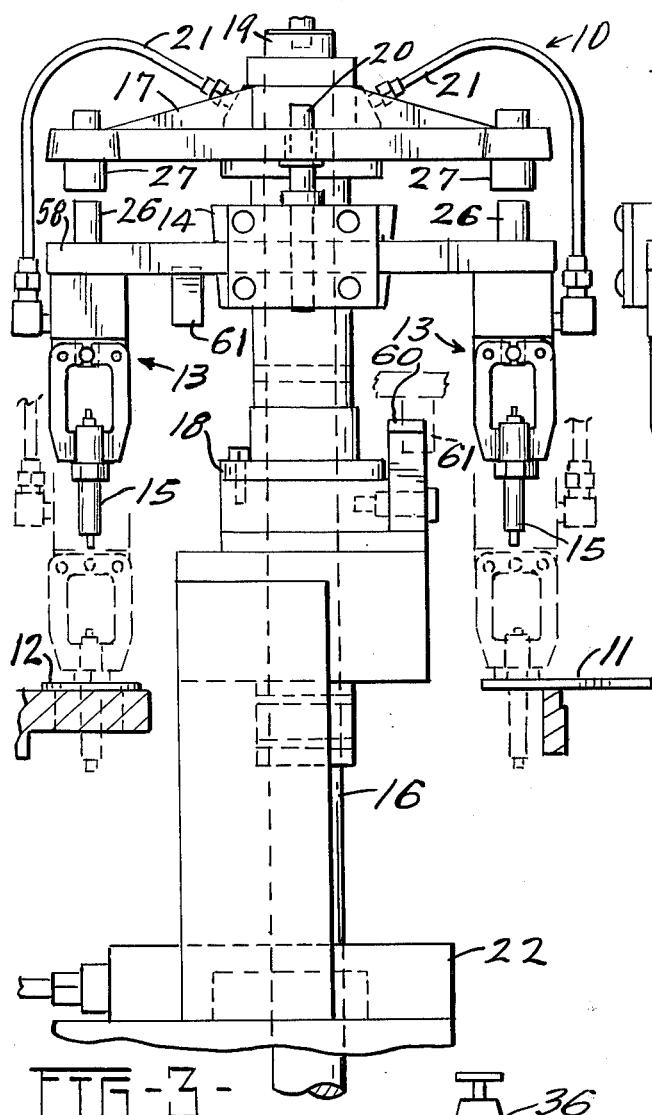
FIG-3-
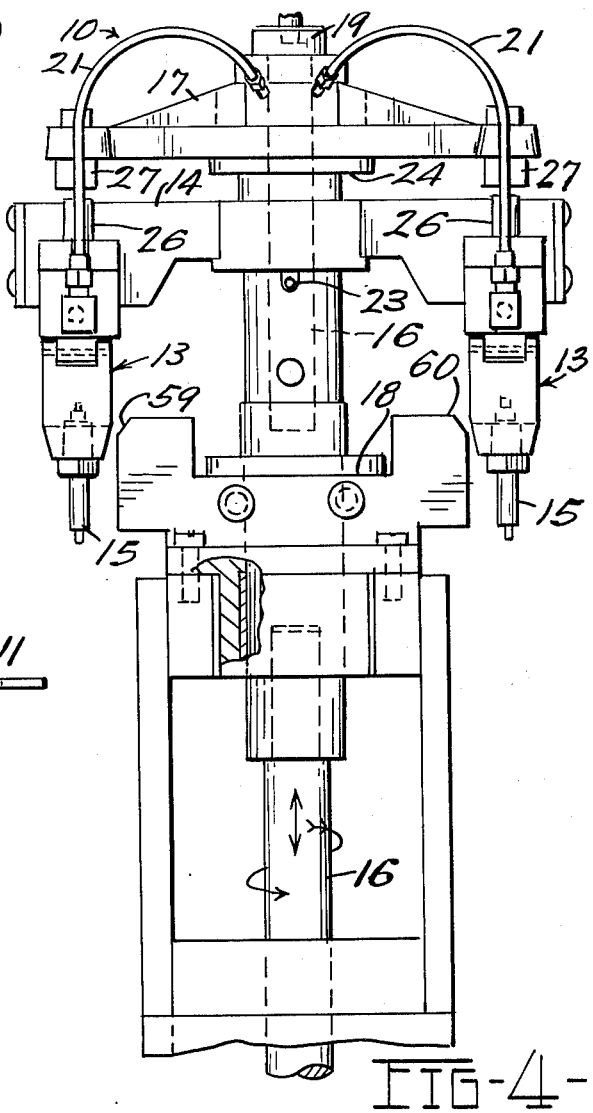
FIG-4-
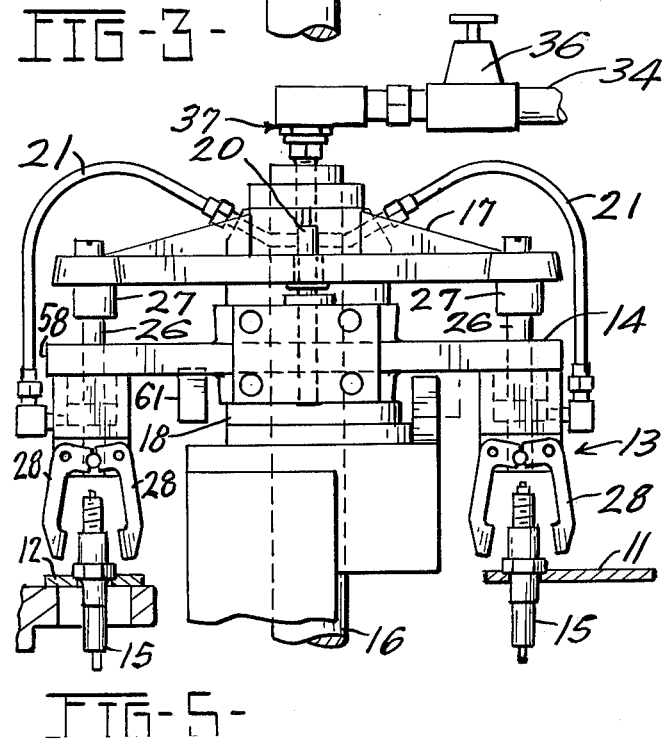
FIG-5-
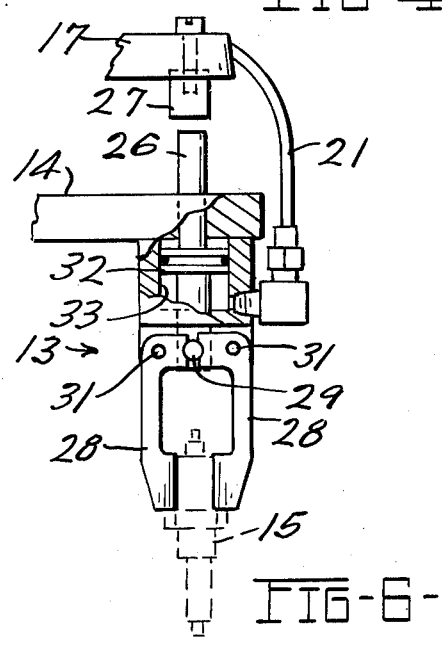
FIG-6-

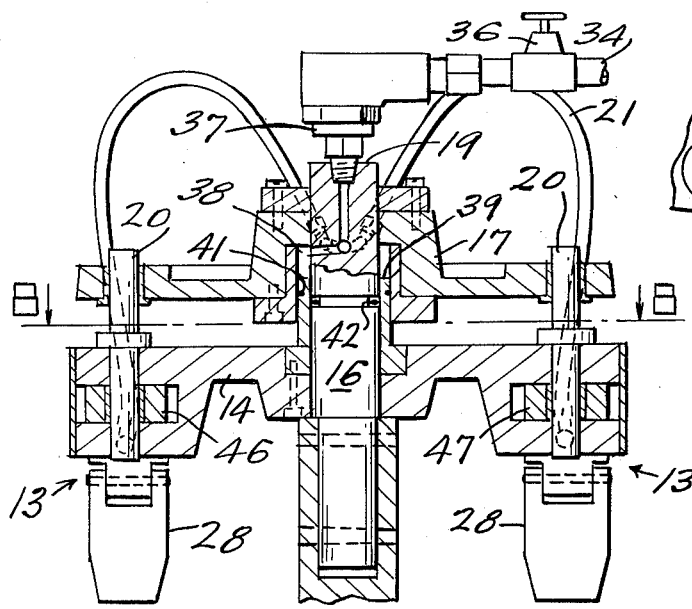
FIG-7-
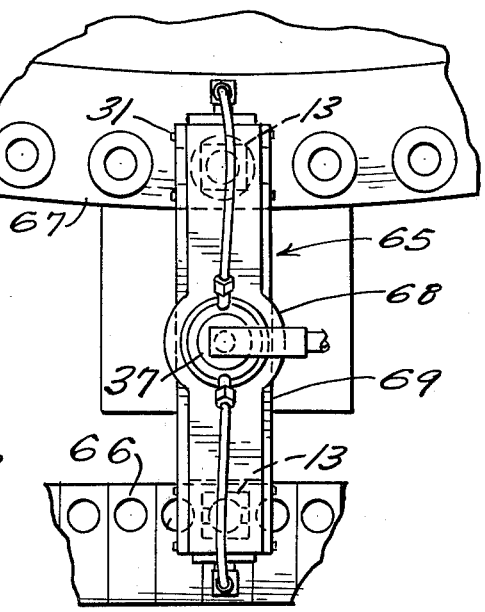
FIG-10-
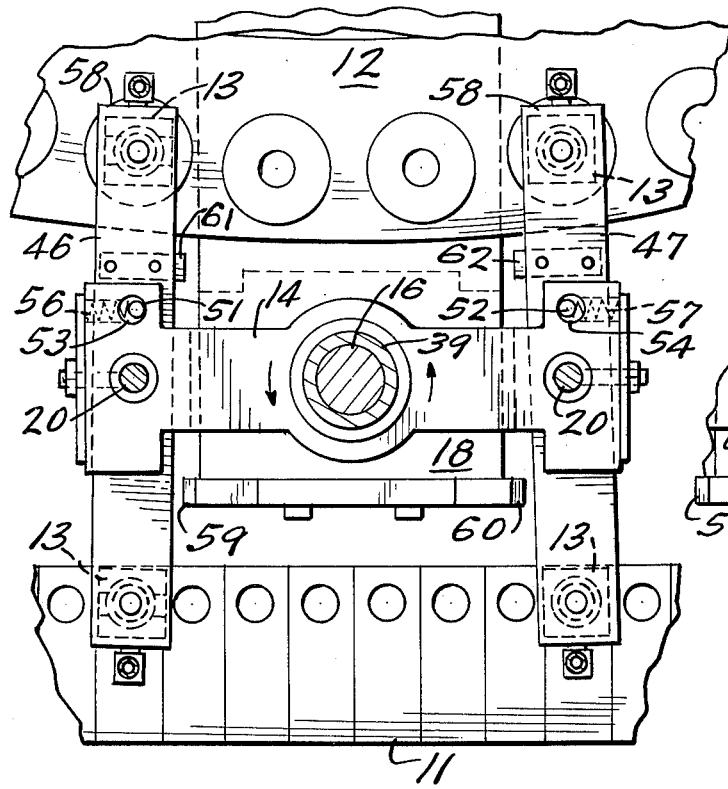
FIG-8-
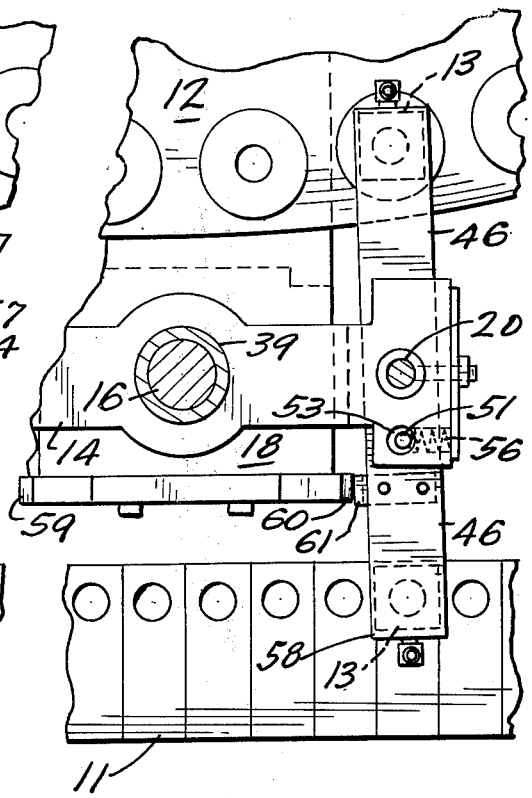
FIG-9-

3,951,272

ARTICLE TRANSFER APPARATUS

BACKGROUND OF THE INVENTION

The invention relates to article transfer apparatus, and more particularly to a device capable of exchanging the positions of two workpieces or two pairs of workpieces at a high rate of speed, utilizing relatively simple motion of a central shaft.

Article transfer devices for use in and between various manufacturing operations utilize a wide variety of apparatus and movements to accomplish the desired transfers. Apparatus for performing transfers similar to that of the present invention or incorporating certain of the apparatus involved in the present invention are shown in U.S. Pat. Nos. 1,556,078, 2,253,283, 2,888,131, 2,927,679, 3,175,705, and 3,520,393 and 3,837,472. Most of the article transfer devices shown in these patents involve relatively complex mechanisms which go through a large number of movements in order to effect the desired transfer. Such apparatus generally requires an undue amount of time for the transfer operations as well as a great deal of maintenance on the complex mechanism. This, of course, is in addition to initial construction cost.

SUMMARY OF THE INVENTION

The present invention provides an article transfer apparatus which is simple and inexpensive in construction and which requires little maintenance in operation. The apparatus utilizes a combination of rotatable and vertically reciprocable movement to transfer workpieces from a first path to a second path at a rate of over 200 workpieces per minute. In addition, the first and second workpiece paths may be of different spacings and one may be linear while the other is arcuate.

The transfer apparatus of the invention utilizes a motive unit which is indexed in accordance with incremental advancements of the first and second workpiece paths. The output of the motive unit is in the form of a vertical shaft which reciprocates upward, rotates 180° and reciprocates downward. The apparatus of the invention converts this motion into a series of operations including engaging of one or more workpieces in each path in gripping jaws, raising the workpieces above their respective paths, rotating the workpieces to exchange positions between the paths, lowering the workpieces into their new positions, and releasing the gripping jaws. If multiple workpieces are handled in each path, the apparatus is capable of changing spacings between paths.

While the workpiece gripping jaws are open in their lowered positions, the conveyors of each workpiece path are advanced to position another set of workpieces in the gripping jaws. When the apparatus is set up to handle two workpieces in each path, the workpiece conveyors are double indexed. I.e., one workpiece gripper in the path is an odd number of workpiece spaces removed from the other, and the workpiece conveyor advances two spacings each time it is indexed, so that the upstream gripper in the path picks up "odd" workpieces while the downstream gripper picks up "even" workpieces.

BRIEF DESCRIPTION OF THE DRAWINGS

FIG. 1 is a plan view of the article transfer apparatus of the invention, showing a linear path and an arcuate path of different workpiece spacings, between which paths articles are being transferred;

FIG. 2 is an elevational view of the apparatus taken along the line 2—2 of FIG. 1;

FIG. 3 is an elevational view of the apparatus taken along the line 3—3 of FIG. 1;

FIG. 4 is a view similar to FIG. 2 but showing the apparatus in a raised position;

FIG. 5 is an elevational view indicating the apparatus with workpiece gripping jaws released;

FIG. 6 is an enlarged, partially broken away elevational view of a workpiecce gripper included in the apparatus of the invention;

FIG. 7 is a sectional elevational view taken along the line 7—7 of FIG. 1;

FIG. 8 is a sectional plan view taken along the line 8—8 of FIG. 7;

FIG. 9 is a sectional plan view similar to FIG. 8 but with the apparatus rotated 180°; and FIG. 10 is a sectional plan view of another embodiment of the invention.

DESCRIPTION OF THE PREFERRED EMBODIMENTS

In the drawings, FIG. 1 shows an article transfer apparatus according to the invention, generally indicated by the reference number 10. The apparatus 10 is shown in operation exchanging pairs of workpieces between a linear conveyor 11 having a first workpiece spacing and an arcuate conveyor 12 having a second workpiece spacing. Generally, the carousel type conveyor 12 would be used to convey workpieces through various manufacturing operations, the finished workpieces being returned to the linear conveyor 11. The portion of the apparatus 10 seen in FIG. 1 makes incremental rotations of 180° to transfer workpieces from the conveyor 12 to the conveyor 11 and from the conveyor 11 to the conveyor 12. Of course the apparatus 10 may be employed to transfer workpieces in one direction only, such as from the conveyor 11 to the carousel conveyor 12. A second apparatus 10 or other transfer means would then be located at another point on the conveyor 12 to unload finished workpieces onto a third conveyor.

As indicated in FIG. 2, the apparatus 10 includes sets of workpiece grippers 13 engaging workpieces 15, a workpiece gripper frame 14 connected to a central shaft 16, an upper frame 17, a base 18, a pneumatic connection 19 and pneumatic lines 21. The lines 21 provide air springs biasing the grippers 13 closed, as will be seen below. It should be understood that although the drawings indicate two workpiece grippers 13 on the apparatus 10 for each conveyor 11 and 12, a large number may be employed if it is desirable to transfer more workpieces per rotation of the apparatus 10.

The elevational view of FIG. 3 shows the apparatus 10 in greater detail, viewed from the left in FIG. 1. Each of the functions performed by rhe apparatus 10 is derived from the motion of the central shaft 16 which is indexed in accordance with incremental advancements of the two workpiece conveyors 11 and 12. The shaft 16 is driven by a driving means 22 such as a unit identified by the catalog number R-125 manufactured by Ferguson Machine Company of St. Louis, Mo. In operation, the shaft 16 rises through a stroke of about 4 inches, rotates 180°, and descends through the same stroke. The reciprocal and rotational movements of the shaft 16 may be mutually exclusive in their periods of occurrence, but in this preferred embodiment rotation begins before the lift stroke is completed, taking place during the last one-sixth of the lift stroke, continues through the dwell of the shaft at its upper position, and continues through the initial one-sixth of the downstroke of the shaft. This overlapping of the shaft's linear and rotational strokes saves time in the transfer operation.

As FIGS. 3, 4 and 5 indicate, the upper frame 17 of the apparatus 10 is directly affixed to the shaft 16 and moves entirely in accordance therewith. The gripper support frame 14, however, is slidably connected to the shaft 16 and connected to the support frame 17 by pins 20 slidable therein so that the two frames rotate together. The frame 14 is thus afforded a vertically slidable movement along the shaft 16. A stop member 23 connected to the shaft 16, as seen in FIG. 4, provides a lower limitation for slidable movement of the gripper support frame 14 along the shaft 16. Thus, the maximum free travel allowed the gripper support frame 14 with respect to the shaft 16 is defined by the space between the stop member 23 and the lower surface 24 of the upper frame 17. The support frame 14 is biased away from the upper frame 17 and toward the stop member 23, as will be seen below. The purpose of the space between the frames 14 and 17 is to allow them to converge together so that nodules 27 on the frame 17 engage plunger rods 26 which open pairs of opposed jaws 28 on the grippers 13. This structure will be more fully explained below.

As indicated in FIG. 5, which shows the lowermost position of the shaft 16 and the upper frame 17, the shaft 16 descends to such a position that the upper frame 17 nearly contacts the gripper support frame 14, which has already bottomed on the base 18. At this point, the plunger rods 26 of the grippers 13 have been fully depressed by the nodules 27 on the upper frame 17, thus fully opening the gripper jaws 28. In this way, the apparatus 10 of the invention utilizes the majority of the downward stroke of the shaft 16, preferably about 3¾ inches, to lower the workpieces onto the conveyors 11 and 12, while the remainder of the stroke, preferably about one-fourth inch, is utilized to open the gripper jaws 28 and release the workpieces. The open gripper jaws 28 are aligned so that the workpiece paths of the conveyors 11 and 12 pass through the spaces defined therebetween, as shown in FIG. 5.

A workpiece gripper 13 is shown in detail in FIG. 6. As the figure indicates, the plunger rod 26 opens the gripper jaws 28 by lowering a central pin 29 connected thereto and also connected to each of the jaws 28, which are pivoted through pivot points 31 spaced outwardly from the central pin 29. As mentioned above, the jaws 28 are biased toward their closed position by an air spring which consists of a piston 32 and cylinder 33 receiving air under pressure from the pneumatic line 21. When the jaws 28 are opened by downward movement of the plunger rod 26, air is forced out of the cylinder 33 and backed up the air line 21, as will be further discussed below.

FIG. 7 indicates the manner of operation of the air springs which bias the gripper jaws 28 toward their closed position and the gripper support frame 14 away from the upper frame 17 on the shaft 16. Air under pressure is fed from a main line 34 through a relieving-type pressure regulator 36 and through a rotary coupling 37 into the pneumatic connection 19. The line 34 and regulator 36 thus do not rotate with the apparatus 10. From the connection 19, pressurized air is fed into the four pneumatic lines 21 leading to the grippers 13 as shown in FIG. 7, and also into an annular chamber 38 which serves as a cylinder applying downward pressure on a piston defined by a sleeve 39 connected to the gripper support frame 14 and slidable with respect to the shaft 16 and the upper frame 17. O-rings 41 and 42 are provided to seal the chamber 38. When the gripper support frame 14 is in its bottomed position and the upper frame 17 converges upon the frame 14, thereby closing the air chamber 38 and opening the gripper jaws as discussed above, small amounts of air from the chamber 38 and from the lines 21 are backed up through the connection 19 and through the relieving regulator 36 up the main air line 34. Thus, the entire air line 34 and possibly a compressed air tank upstream are available to absorb the backed up air from the air springs. This facilitates an even, constant pressure in the air springs, making them superior to mechanical springs in this situation.

FIGS. 8 and 9 indicate the structure and manner of operation of a mechanism included in the invention for changing the spacing of workpieces as they are moved from the conveyor 11 to the conveyor 12 and vice versa. As FIG. 8 indicates, the gripper support frame 14 includes a pair of horizontally swingable arms 46 and 47 pivotally connected to the central portion of the frame 14 by the vertical pins 20 also seen in FIGS. 3, 5 and 7. On each arm, the grippers 13 extend downward from the ends thereof at equal distances from the centrally located pivot pin 20. Motion limiting stop pins 51 and 52 and bores 53 and 54 are provided to define equal arcs for each of the arms 46 and 47 with respect to the central transverse portion of the support frame 14. The arc so defined by the pin 51 and bore 53 on the arm 46, for example, is such that in the position of FIG. 8 with the pin 51 fully against the inner side of the bore 53, the grippers 13 at the ends of the arm 46 are in position to engage respective workpieces on the conveyors 11 and 12. The arm 47 is in a similar position and it is noted that the spacing between the workpieces being engaged on the conveyor 12 is somewhat narrower than the spacing of the subject workpieces on the conveyor 11. Compression springs 56 and 57 bias the pins 51 and 52 inwardly, thus tending to maintain the position of FIG. 8. Therefore, whenever the gripper support frame 14 is pivoted such that inwardly biased ends 58 of the arms 46 and 47 are adjacent the conveyor 12 of narrower spacing as shown in FIG. 8, the four grippers 13 will automatically be set at the correct spacing as they are lowered toward the conveyors 11 and 12.

In FIG. 9 the gripper support frame 14 is shown in a position 180° rotated from that of FIG. 8. The arms 46 and 47 have been rotated about the pivot pins 20 so that the arm 46, for example, is in a position counterclockwise of its position in FIG. 8. Thus the grippers 13 are again in position over the conveyors 11 and 12, with the inwardly biased ends 58 of the arm now diverging outwardly to accommodate the wider spacing of the conveyor 11. The rotation of the arms 46 and 47 is accomplished by cams 59 and 60 on the stationary base 18 and cam followers 61 and 62 on the arms 46 and 47, respectively, as seen in FIGS. 8 and 9. The cams 59 and 60 are inclined to accommodate the cam followers 61 and 62 as the arms 46 and 47 descend downwardly toward the conveyors 11 and 12, with the gripper spacings being properly adjusted for the conveyors 11 and 12 when the gripper support frame 14 is in its lowermost position in contact with the base 18. FIG. 3 shows the cam 60 and follower 61 in elevation.

If additional grippers are provided on the apparatus 10 for each conveyor path, the support frame 14 would include additional support arms similar to the arms 46 and 47 connected to the transverse central portion of the frame 14. With an odd number of support arms, a central arm would remain fixed, while all other arms toward each end of the frame 14 would pivot to change spacings. The space-changing structure would be very similar to the above described structure. Of course if a large number of arms are provided, extending a substantial distance along each conveyor, the paths of the conveyors 11 and 12 would have to be either both linear or both arcuate. Otherwise the arc defined by one set of grippers would not match the linear conveyor, and vice versa.

In operation of the transfer apparatus 10, the cycle can be considered as beginning with the gripper jaws 28 open and ready to engage two pairs of workpieces 15, as shown in FIG. 5. The conveyors 11 and 12 are at rest, having delivered the workpieces 15 to the positions shown. In this position, both the gripper support frame 14 and the upper frame 17 are in their full downward positions, and the nodules 27 are fully depressing the plunger rods 26 of the grippers 13, holding the jaws 28 open. The inwardly spring-biased ends 58 of the swingable arms 46 and 47 are in their inward converged position as shown in FIG. 8, under the influence of the compression springs 56 and 57 and without influence of the cams 59 and 60.

Following the position of FIG. 5, the central shaft 16 of the apparatus 10 is indexed by the driving means 22 to move upwardly, initially moving only the upper frame 17 upward therewith. The first one-fourth inch or so of upward movement of the frame 17 separates the frame 17 from the frame 14 by the action of the air spring biasing them apart. This allows the gripper plunger rods 26 to rise and the gripper jaws 28 to close under the influence of the gripper air springs. After the frames 7 and 14 have separated as shown in FIG. 2, the stop member 23 (see FIG. 4) is engaged to begin the upward movement of the gripper support frame 14 along with the central shaft 16. Both frames then move upward along with the shaft 16 as indicated in FIG. 3. As discussed above, the rotation of the shaft 16 and frames 17 and 14 begins before the completion of the upward stroke in order to provide a more rapid transfer operation. When the rotation begins, the vertical stroke has progressed far enough to bring the workpieces 15 well clear of the conveyors 11 and 12.

When the 180° rotation is completed, the downward stroke of the apparatus has already begun, as discussed above. See FIG. 4.

As the shaft 16, gripper support frame 14 and upper frame 17 descend, the swingable arms 46 and 47 take the position shown in FIG. 9 (only the arm 46 shown) under the influence of the angled cams 59 and 60 and the cam followers 60 and 61. The position of FIG. 9 is attained when the gripper support frame 14 has reached its bottom position in contact with the base 18. At this point, the central shaft 16 continues to descend, drawing the upper frame 17 downward into convergence with the frame 14 against the influence of the air spring. As discussed above, the last one-fourth inch of the stroke of the frame 17 opens the gripper jaws 28 against the air springs. FIG. 5 indicates this position of the apparatus 10, except that in the sequence described, the cam 61 would appear on the opposite side of the frame 14. The apparatus 10 has now reversed the position of two pairs of workpieces between the two conveyors 11 and 12.

With the jaws 28 remaining open as shown in FIG. 5, the double indexing conveyors 11 and 12 are each indexed to advance two workpiece spacings, thereby removing two unfinished workpieces from the grippers on the conveyor 12 and two finished workpieces from the grippers on the conveyor 11. Similarly, two finished workpieces are brought into the grippers on the conveyor 12 while two unfinished workpieces are brought into the grippers on the conveyor 11. FIG. 1 best indicates this sequence. Because the pairs of grippers along each conveyor 11 and 12 are an odd number of workpiece spacings apart, a finished workpiece deposited on the conveyor 11 by the upstream gripper is not handled by the downstream gripper, but rather is passed through the open gripper jaws as the conveyor 11 is indexed to advance two spaces. The same, of course, is true of the opposite conveyor 12. If the apparatus 10 includes three or more workpiece grippers 13 for each conveyor, the conveyors are indexed to advance that number of spacings. The grippers are spaced along the conveyors accordingly, so that no workpiece handled by an upstream gripper is also handled by a downstream gripper.

The conveyors 11 and 12 are connected either mechanically or electronically to the driving and indexing means 22. The actual power for the conveyors and for the means 22 may be provided from a common source.

FIG. 10 shows another embodiment of the invention. A single-arm article transfer apparatus 65 is employed to exchange workpieces between single indexing conveyors 66 and 67 each of which may be arcuate or linear and/or of varying workpiece spacing. The apparatus 65 includes an upper frame 68 for opening grippers 13 at the end of its downstroke as in the previously described embodiment. A gripper support arm 69 positions the grippers 13 over the workpiece conveyors 66 and 67, which advance only one spacing when the grippers are in their open position. In elevation, the apparatus 65 appears almost identical to the elevational views of FIGS. 3 and 5, with the exception that no means for changing spacing is provided since the apparatus 65 includes only one gripper support arm 69. In operation, the apparatus 65 is identical to the apparatus 10 except that the space changing function is not included and every workpiece along each path 66 and 67 is handled by the two grippers 13.

The above described preferred embodiments provide article transfer apparatus capable of exchanging workpieces from first and second paths at a very rapid rate without the use of complex, expensive and unreliable equipment. Various other embodiments and alterations to these preferred embodiments will be apparent to those skilled in the art and may be made without departing from the spirit and scope of the following claims.

I claim:

1. An article transfer apparatus for transferring workpieces from a first path to a second path, comprising: a base; a vertical support shaft extending upwardly through the base; means for raising, rotating through 180° and lowering the shaft repeatedly; at least one workpiece gripper on each of two sides of the shaft, said two sides being 180° opposed; a gripper frame supporting the grippers at its extremities, said frame being operably mounted on the shaft for rotation with the shaft and for axial movement along the shaft; a stop member below the frame on the shaft defining a lower limit for axial movement of the frame along the shaft; an upper surface on the base positioned for abutting contact with the bottom of the frame, the lower limit of the shaft's stroke being beyond the initial rest position of the frame on the base; means urging the frame downward on the shaft toward the stop member; means biasing the workpiece grippers toward their closed gripping positions; an upper frame affixed to the shaft above the gripper frame; and means associated with the workpiece grippers for opening the grippers in response to convergence of the frames.

2. An article transfer apparatus for transferring workpieces from a first path to a second path, comprising:
 a base;
 a vertical support shaft extending upwardly through the base;
 means for raising, rotating through 180° and lowering the shaft repeatedly;
 at least two workpiece grippers on each of two sides of the shaft, said two sides being 180° opposed;
 means connecting the shaft and the workpiece grippers;
 means biasing said workpiece grippers toward their closed gripping positions;
 means responsive to the vertical position of the shaft for opening said workpiece grippers; and
 means for changing the spacing between adjacent grippers on each side of the shaft, from a first spacing at said first workpiece path to a second spacing at said second workpiece path and from said second spacing back to said first spacing.

3. The apparatus of claim 2 wherein said spacing means and said connecting means comprise a transverse frame member connected to the support shaft for rotation and at least partial vertical reciprocation therewith, gripper support arms at equal spacings along the frame member and extending generally normally to said workpiece paths between rotations of the shaft, each end of each arm having a gripper mounted thereto, at least two of said arms being pivotally mounted from their centers to the frame member, and camming means on said pivotal arms responsive to vertical movement thereof for placing the grippers adjacent said first path at said first path at said first spacing and the grippers adjacent said second path at said second spacing.

4. The apparatus of claim 3 wherein said camming means comprises stop means between each pivotal arm and the transverse frame member establishing a limited arcuate movement for the arm, spring means urging each pivotal arm on one end of the frame member in one direction and each pivotal arm on the other end of the frame member in the opposite direction against the stop means, a camming surface on one end of each pivotal arm, and a complementarily shaped camming surface on the base adjacent each arm camming surface when the support shaft is in one rotational position, said camming surfaces being disposed to pivot each pivotal arm on said one end in said opposite direction and each pivotal arm on said other end in said one direction to positions equal and opposite to the positions urged by said spring means.

* * * * *